United States Patent
Tang et al.

(10) Patent No.: US 11,619,289 B2
(45) Date of Patent: Apr. 4, 2023

(54) CONTINUOUSLY VARIABLE TRANSMISSION

(71) Applicant: WEIHAI TUANZHONG TRANSMISSION CO., LTD., Weihai (CN)

(72) Inventors: Yongfeng Tang, Weihai (CN); Yuning Tang, Weihai (CN)

(73) Assignee: WEIHAI TUANZHONG TRANSMISSION CO., LTD., Weihai (CN)

( * ) Notice: Subject to any disclaimer, the term of this patent is extended or adjusted under 35 U.S.C. 154(b) by 16 days.

(21) Appl. No.: 17/594,488

(22) PCT Filed: Feb. 5, 2020

(86) PCT No.: PCT/CN2020/074336
§ 371 (c)(1),
(2) Date: Oct. 18, 2021

(87) PCT Pub. No.: WO2020/238280
PCT Pub. Date: Dec. 3, 2020

(65) Prior Publication Data
US 2022/0178432 A1 Jun. 9, 2022

(30) Foreign Application Priority Data
May 29, 2019 (CN) .......................... 201910453926.9

(51) Int. Cl.
*F16H 47/12* (2006.01)
*B60K 6/543* (2007.10)

(52) U.S. Cl.
CPC ............. *F16H 47/12* (2013.01); *B60K 6/543* (2013.01); *B60Y 2200/92* (2013.01); *B60Y 2400/72* (2013.01)

(58) Field of Classification Search
CPC .................................. F16H 47/12; F16H 33/16
(Continued)

(56) References Cited

U.S. PATENT DOCUMENTS 1,551,694 A * 9/1925 Reece ..................... F16H 33/16
192/105 A
1,691,611 A * 11/1928 Reece ..................... F16H 33/16
475/112
(Continued)

FOREIGN PATENT DOCUMENTS

GB 762873 A * 12/1956
WO 2015188764 A1 12/2015

*Primary Examiner* — Sherry L Estremsky
(74) *Attorney, Agent, or Firm* — Platinum Intellectual Property PC (57) ABSTRACT

Provided is a continuously variable transmission, comprising an outer shell (1), wherein a middle shell (101) is provided in the middle of the outer shell (1), two sides of the middle shell (101) are respectively provided with a first end cover (102) and a second end cover (103), a third shaft (12) is arranged in the middle of the first end cover (102) in a penetrating manner, the third shaft (12) is connected to a bucket-wheel sun gear (501), the inside of the third shaft (12) is a hollow structure, a second shaft (11) is arranged in the middle of the second end cover (103) in a penetrating manner, the second shaft (11) is connected to a second sun gear (401), the middle of a first sun gear (301) is fixedly provided with a first shaft (10), the first shaft (10) passes through the third shaft (12), the inside of which is a hollow structure, in a penetrating manner, and the radius of rotation of a bucket-wheel planetary gear (502) rotating around the bucket-wheel sun gear (501) is greater than the radius of rotation of a second planetary gear (402) rotating around the second sun gear (401) and the radius of rotation of a first planetary gear (302) rotating around the first sun gear (301). The continuously variable transmission solves the technical (Continued)

problems of it being difficult, when a continuously variable transmission is applied to hybrid power transmission, to achieve arrangement in the same axis and complicated hybrid power assembly structure when a first shaft is connected to an engine or an output device and a third shaft is connected to an electric motor and can be widely applied to the field of transmission.

5 Claims, 7 Drawing Sheets

(58) Field of Classification Search
 USPC .......................................................... 475/112
 See application file for complete search history.

(56) References Cited

U.S. PATENT DOCUMENTS

| | | | | |
|---|---|---|---|---|
| 1,750,787 | A * | 3/1930 | Strigl | F16H 33/16 |
| | | | | 475/112 |
| 1,936,165 | A * | 11/1933 | Janssen | F16H 33/16 |
| | | | | 475/112 |
| 2,091,210 | A * | 8/1937 | Mattia | F16H 33/16 |
| | | | | 475/112 |
| 2,293,547 | A * | 8/1942 | Hobbs | F16H 47/12 |
| | | | | 475/111 |
| 2,421,675 | A * | 6/1947 | Bacon | F16H 47/12 |
| | | | | 74/730.1 |
| 10,677,336 | B2 * | 6/2020 | Tang | F16H 47/08 |
| 2022/0107017 | A1 * | 4/2022 | Tang | F16H 47/12 |

* cited by examiner

CONTINUOUSLY VARIABLE TRANSMISSION

RELATED APPLICATIONS

This application is a United States National Stage Application filed under 35 U.S.C 371 of PCT Patent Application Serial No. PCT/CN2020/074336, filed Feb. 5, 2020, which claims Chinese Patent Application Serial No. CN 201910453926.9, filed May 29, 2019, the disclosure of all of which are hereby incorporated by reference in their entirety.

BACKGROUND OF THE INVENTION

Field of the Invention

The present invention relates to a mechanical transmission apparatus, and in particular to a continuously variable transmission.

Description of the Related Art

An existing continuously variable transmission proposed in Chinese patent application 2019101280905 has following technical solutions: a continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the inside of the first shaft is a hollow structure, the first shaft is rotatably connected to the first end cover, a first sun gear is fixedly provided on the first shaft, the first sun gear is located inside the first end cover, the first sun gear is adjacently provided with a first support frame, a first planet gear is provided on an outer circumference of the first sun gear, the first planet gear is engaged with the first sun gear, and the first planet gear and the first sun gear constitute a first planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a bucket wheel sun gear is provided inside the first support frame, a third support frame is adjacently provided inside the bucket wheel sun gear, a bucket wheel planet gear is provided on an outer circumference of a bucket wheel sun gear, the bucket wheel planet gear is engaged with the bucket wheel sun gear, and the bucket wheel planet gear and the bucket wheel sun gear constitute a bucket wheel planet gear set; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a third shaft is fixedly provided in the middle of the bucket wheel sun gear, the third shaft penetrates through the first support frame and the first shaft whose inside is a hollow structure, and the third shaft is rotatably connected to the first support frame; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

The disadvantage of this continuously variable transmission structure is as follows. The bucket wheel planet gear set is located between the first planet gear set and the second planet gear set, the first shaft fixedly connected to the sun gear of the first planet gear set is a hollow structure, and the third shaft fixedly connected to the bucket wheel sun gear passes through the hollow first shaft. Therefore, when the continuously variable transmission of this structure is applied to hybrid power transmission, the first shaft needs to be connected to an engine or output device, and the third shaft needs to be connected to a motor. In this case, it is difficult for the device connected by two shafts to achieve a coaxial arrangement, resulting in a complex structure layout, a large volume, a complex assembly structure of hybrid power and difficult application.

SUMMARY OF THE INVENTION

The present invention is to solve the following technical problem. That is, the bucket wheel planet gear set of the continuously variable transmission is located between the first planet gear set and the second planet gear set, the first shaft fixedly connected to the sun gear of the first planet gear set is a hollow structure, the third shaft fixedly connected to the bucket wheel sun gear penetrates through the first shaft whose inside is a hollow structure, when the continuously variable transmission is applied to hybrid power transmission, the first shaft is connected to an engine or output device, and the third shaft is connected to a motor, it is difficult for the device connected by two shafts to achieve the coaxial arrangement, and the assembly structure of hybrid power is complex. The present invention provides a continuously variable transmission which achieves the coaxial assembly and compact structure and is suitable for hybrid power, wherein the bucket wheel planet gear set is located outside the first planet gear set, the third shaft fixedly connected to the bucket wheel sun gear of the bucket wheel planet gear set is a hollow structure, the first shaft fixedly connected to the first sun gear of the first planet gear set penetrates through the third shaft whose inside is a hollow structure, when the first shaft is connected to an engine or output device and the third shaft is connected to a motor, the hollow third shaft is connected to the motor having a hollow shaft and the first shaft penetrates through the third shaft and the motor having a hollow shaft.

To this end, the technical solution of the present invention is a continuously variable transmission provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a third shaft penetrates in the middle of the first end cover, the inside of the third shaft is a hollow structure, the third shaft is rotatably connected to the first end cover, a bucket wheel sun gear is fixedly provided on the third shaft, the bucket wheel sun gear is located inside the first end cover, the bucket wheel sun gear is adjacently provided with a first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a first sun gear is provided inside the first support frame, a third support frame is adjacently provided inside the first sun gear, a first shaft is fixedly provided in the middle of the first sun gear, the first shaft penetrates through the first support frame and the third shaft whose inside is a hollow structure, the first shaft is rotatably connected to the first support frame, a first planet gear is provided on an outer circumference of the first sun gear, the first planet gear is engaged with the first sun gear, and the first planet gear and the first sun gear constitute a first planet gear set; a bucket wheel planet gear shaft is fixedly provided in the middle of the bucket wheel planet gear, the bucket wheel planet gear shaft passes through the first support frame and the third support frame, the bucket wheel planet gear shaft is rotatably connected to the first support frame and the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the third support frame and the second support frame, the planet gear shaft is rotatably connected to the third support frame and the second support frame respectively, and the planet gear shaft passing through the third support frame and the second support frame is fixedly connected to the second planet gear; a rotation radius of the bucket wheel planet gear revolving around the bucket wheel sun gear is larger than that of the second planet gear revolving around the second sun gear and the first planet gear revolving around the first sun gear.

Preferably, the outer housing is provided with a housing control end.

Preferably, a semicircular cavity is provided in a position corresponding to the bucket wheel in an inner wall of the outer housing, and the bucket wheel is located in the semicircular cavity.

Preferably, there are 3 or more bucket wheel planet gears or first planet gears or second planet gears.

Preferably, a central bucket wheel is fixedly provided on the first shaft or the second shaft.

Preferably, a gear outer engagement manner of the bucket wheel sun gear and the bucket wheel planet gear in the bucket wheel planet gear set can be replaced with a gear ring inner engagement manner of a bucket wheel gear ring and the bucket wheel planet gear.

Preferably, a gear outer engagement manner of the first sun gear and the first planet gear in the first planet gear set can be replaced with a gear ring inner engagement manner of a first gear ring and the first planet gear.

Preferably, a gear outer engagement manner of the second sun gear and the second planet gear in the second planet gear set can be replaced with a gear ring inner engagement manner of a second gear ring and the second planet gear.

A continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a third shaft penetrates in the middle of the first end cover, the inside of the third shaft is a hollow structure, the third shaft is rotatably connected to the first end cover, a bucket wheel gear ring is fixedly provided on the third shaft, the bucket wheel gear ring is located inside the first end cover, the bucket wheel gear ring is adjacently provided with a first support frame, a bucket wheel planet gear is provided inside an outer circumference of the bucket wheel gear ring, the bucket wheel planet gear is engaged with the bucket wheel gear ring, and the bucket wheel planet gear and the bucket wheel gear ring constitute a bucket wheel planet gear set; a second shaft penetrates in the middle of the second end cover, the second shaft is rotatably connected to the second end cover, a second gear ring is fixedly provided on the second shaft, the second gear ring is located inside the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set; a first gear ring is provided inside the first support frame, a third support frame is adjacently provided inside the first gear ring, a first shaft is fixedly provided in the middle of the first gear ring, the first shaft penetrates through the first support frame and the third shaft whose inside is a hollow structure, the first shaft is rotatably connected to the first support frame, a first planet gear is provided inside an outer circumference of the first gear ring, the first planet gear is engaged with the first gear ring, and the first planet gear and the first gear ring constitute a first planet gear set; a bucket wheel planet gear shaft is fixedly provided in the middle of the bucket wheel planet gear, the bucket wheel planet gear shaft passes through the first support frame and the third support frame, the bucket wheel planet gear shaft is rotatably connected to the first support frame and the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the third support frame and the second support frame, the planet gear shaft is rotatably connected to the third support frame and the second support frame respectively, and the planet gear shaft passing through the third support frame and the second support frame is fixedly connected to the second planet gear; a rotation radius of the bucket wheel planet gear revolving around the bucket wheel gear ring is larger than that of the second planet gear revolving around the second gear ring and the first planet gear revolving around the first gear ring.

The benefit effects of the present invention are as follows. The continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a third shaft penetrates in the middle of the first end cover, the inside of the third shaft is a hollow structure, the third shaft is rotatably connected to the first end cover, a bucket wheel sun gear is fixedly provided on the third shaft, the bucket wheel sun gear is located inside the first end cover, the bucket wheel sun gear is adjacently provided with a first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a first sun gear is provided inside the first support frame, a third support frame is adjacently provided inside the first sun gear, a first shaft is fixedly provided in the middle of the first sun gear, the first shaft penetrates through the first support frame and the third shaft whose inside is a hollow structure, the first shaft is rotatably connected to the first support frame, a first planet gear is provided on an outer circumference of the first sun gear, the first planet gear is engaged with the first sun gear, and the first planet gear and the first sun gear constitute a first planet gear set; a bucket wheel planet gear shaft is fixedly provided in the middle of the bucket wheel planet gear, the bucket wheel planet gear shaft passes through the first support frame and the third support frame, the bucket wheel planet gear shaft is rotatably connected to the first support frame and the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the third support frame and the second support frame, the planet gear shaft is rotatably connected to the third support frame and the second support frame respectively, and the planet gear shaft passing through the third support frame and the second support frame is fixedly connected to the second planet gear; a rotation radius of the bucket wheel planet gear revolving around the bucket wheel sun gear is larger than that of the second planet gear revolving around the second sun gear and the first planet gear revolving around the first sun gear. Therefore, in a case of being applied to a continuously variable transmission for hybrid power, when the first shaft is connected to the engine or output device and the third shaft is connected to the motor, the bucket wheel planet gear set is located outside the first planet gear set, the third shaft fixed connected to the bucket wheel sun gear of the bucket wheel planet gear set is a hollow structure, and the first shaft fixedly connected to the first sun gear of the first planet gear set penetrates through the third shaft whose inside is a hollow structure. Since the main shaft of the motor is easy to be made into a hollow shaft penetrating the entire motor axis, the third shaft is connected to the motor having a hollow shaft, and the first shaft is connected to the engine or output device after passing through the hollow third shaft and the motor having the hollow shaft. The continuously variable transmission realizes the coaxial arrangement structure, which is easy to cooperate and constitute a compact transmission system suitable for hybrid power.

At the same time, since the rotation radius of the bucket wheel planet gear revolving around the bucket wheel sun gear is larger than that of the second planet gear revolving around the second sun gear and the first planet gear revolving around the first sun gear, the kinetic stress radius of bucket wheel oil is larger than the gear stress radius of the first planet gear and the second planet gear, so that the capacity of transmitting torque by the transmission is stronger; since the planet gear shaft and the bucket wheel planet gear shaft are not coaxial, when both the planet gear shaft and the bucket wheel planet gear shaft are supported by bearings on the second support frame, on the second support frame, the bearing supporting the planet gear shaft and the bearing supporting the bucket wheel planet gear shaft are arrayed on the same plane instead of being arrayed on the same axis, which reduces the thickness of the second support frame and shortens the length of the continuously variable transmission.

1. outer housing; 101. intermediate housing; 102. first end cover; 103. second end cover; 2. inner cavity; 3. first planet gear set; 301. first sun gear; 301A. first gear ring; 302. first planet gear; 4. second planet gear set; 401. second sun gear; 401A. second gear ring; 402. second planet gear; 5. bucket wheel planet gear set; 501. bucket wheel sun gear; 501A.

bucket wheel gear ring; 502. bucket wheel planet gear; 6. bucket wheel set; 601. bucket wheel; 7. first support frame; 8. second support frame; 9. third support frame; 10. first shaft; 11. second shaft; 12. third shaft; 13. planet gear shaft; 14. bucket wheel planet gear shaft; 15. central bucket wheel; 16. housing control end.

DESCRIPTION OF THE EMBODIMENTS

The present invention will be further described below in conjunction with the embodiments.

Embodiment 1

FIGS. 1-8 show an embodiment of a continuously variable transmission of the present invention. The continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity; a third shaft 12 penetrates in the middle of the first end cover 102, the inside of the third shaft 12 is a hollow structure, the third shaft 12 is rotatably connected to the first end cover 102, a bucket wheel sun gear 501 is fixedly provided on the third shaft 12, the bucket wheel sun gear 501 is located inside the first end cover 102, the bucket wheel sun gear 501 is adjacently provided with a first support frame 7, a bucket wheel planet gear 502 is provided on an outer circumference of the bucket wheel sun gear 501, the bucket wheel planet gear 502 is engaged with the bucket wheel sun gear 501, and the bucket wheel planet gear 502 and the bucket wheel sun gear 501 constitute a bucket wheel planet gear set 5; a second shaft 11 penetrates in the middle of the second end cover 103, the second shaft 11 is rotatably connected to the second end cover 103, a second sun gear 401 is fixedly provided on the second shaft 11, the second sun gear 401 is located inside the second end cover 103, the second sun gear 401 is adjacently provided with a second support frame 8, a second planet gear 402 is provided on an outer circumference of the second sun gear 401, the second planet gear 402 is engaged with the second sun gear 401, and the second planet gear 402 and the second sun gear 401 constitute a second planet gear set 4; a first sun gear 301 is provided inside the first support frame 7, a third support frame 9 is adjacently provided inside the first sun gear 301, a first shaft 10 is fixedly provided in the middle of the first sun gear 301, the first shaft 10 penetrates through the first support frame 7 and the third shaft 12 whose inside is a hollow structure, the first shaft 10 is rotatably connected to the first support frame 7, a first planet gear 302 is provided on an outer circumference of the first sun gear 301, the first planet gear 302 is engaged with the first sun gear 301, and the first planet gear 302 and the first sun gear 301 constitute a first planet gear set 3; a bucket wheel planet gear shaft 14 is fixedly provided in the middle of the bucket wheel planet gear 502, the bucket wheel planet gear shaft 14 passes through the first support frame 7 and the third support frame 9, the bucket wheel planet gear shaft 14 is rotatably connected to the first support frame 7 and the third support frame 9, a bucket wheel 601 is fixedly provided on the bucket wheel planet gear shaft 14 passing through the third support frame 9, the bucket wheel 601 is located between the second support frame 8 and the third support frame 9, and the bucket wheels 601 fixedly provided on a plurality of the bucket wheel planet gear shafts 14 constitute a bucket wheel set 6; a planet gear shaft 13 is fixedly provided in the middle of the first planet gear 302, the planet gear shaft 13 passes through the third support frame 9 and the second support frame 8, the planet gear shaft 13 is rotatably connected to the third support frame 9 and the second support frame 8 respectively, and the planet gear shaft 13 passing through the third support frame 9 and the second support frame 8 is fixedly connected to the second planet gear 402; a rotation radius of the bucket wheel planet gear 502 revolving around the bucket wheel sun gear 501 is larger than that of the second planet gear 402 revolving around the second sun gear 401 and the first planet gear 302 revolving around the first sun gear 301.

In this embodiment, the third shaft 12 penetrates in the middle of the first end cover 102, the inside of the third shaft 12 is a hollow structure, the bucket wheel sun gear 501 is fixedly provided on the third shaft 12, the first shaft 10 is fixedly provided in the middle of the first sun gear 301, the first shaft 10 penetrates through the first support frame 7 and the third shaft 12 whose inside is a hollow structure, the first shaft 10 is rotatably connected to the first support frame 7, the second shaft 11 penetrates in the middle of the second end cover 103, the second sun gear 401 is fixedly provided on the second shaft 11, and a housing control end 16 connected to the outer housing 1 is located in the middle position outside the second end cover 103. With this structure, the housing control end 16, the first shaft 10, the second shaft 11, and the third shaft 12 form four control ends.

Since the main shaft of the motor is easy to be made into a hollow shaft penetrating the entire motor axis, when it is set that the third shaft 12 is connected to the A motor, the housing control end 16 is connected to the B motor, the first shaft 10 is connected to the engine, and the second shaft 11 is connected to the output device, a hollow shaft of the A motor with the hollow shaft is connected to the hollow third shaft 12, the first shaft 10 penetrates through the hollow shaft of the A motor and the hollow third shaft 12 that are connected, and the engine and the A motor are installed coaxially; a hollow shaft of the B motor with the hollow shaft is connected to the hollow housing control end 16, and the second shaft 11 penetrates through the hollow shaft of the B motor and the hollow housing control end 16 that are connected, and the output device and the B motor are installed coaxially. When the first shaft 10 is connected to the output device, the second shaft 11 is connected to the engine, and the housing control end 16 and the third shaft 12 can cooperate with the motor with the hollow shaft to achieve coaxial installation, the installation space is saved, various transmission occasions can be met, and it is convenient to use.

The operation process of the continuously variable transmission of this embodiment is as follows. When the power is input clockwise from the first shaft 10 to drive the first sun gear 301 to rotate clockwise, the first sun gear 301 drives the first planet gear 302 to rotate counterclockwise, and drives the second planet gear 402 to rotate counterclockwise through the fixedly connected planet gear shaft 13. At this time, since the second sun gear 401 is subjected to a load resistance from the second shaft 11, the second planet gear 402 revolves counterclockwise around the second sun gear 401, which drives the first support frame 7, the second support frame 8, the third support frame 9 and the outer housing 1 to revolve counterclockwise at a whole. It is set that, the third shaft 12 is subjected to external resistance, and this resistance is defined as F3. Under the action of F3, the bucket wheel sun gear 501 does not move, and the outer housing 1 revolves counterclockwise to drive the bucket wheel planet wheel 502 to revolve counterclockwise around the bucket wheel sun gear 501, so as to drive the bucket wheel 601 to rotate counterclockwise. A moderate amount of oil is contained in the intermediate housing 101, the rotated bucket wheel 601 is subjected to a resistance of the oil in the intermediate housing 101 to form a resistance torque. This resistance includes hydrodynamic gravity formed by the revolution of the intermediate housing 101, hydrodynamic force due to oil injection from the bucket wheel 601 to the adjacent bucket wheel 601, and hydrodynamic viscous force of oil between the bucket wheel 601 and the semicircular cavity of the inner wall of the outer housing 1. The resistance torque formed by the bucket wheel 601 is simultaneously transmitted to the first support frame 7, the second support frame 8 and the third support frame 9. The second planet gear 402 forms a torque that prevents the revolution caused by the resistance of the second shaft 11, thereby driving the second planet gear 402 to exert force on the second sun gear 401. The second sun gear 401 drives the second shaft 11 to output power. The resistance of the oil to the bucket wheel 601 starts at 0, and increases exponentially as the speed of the first shaft 10 increases. The second sun gear 401 drives the second shaft 11 to rotate, thereby outputting power through the second shaft 11.

At the initial stage of starting in the above process of the continuously variable transmission, the continuously variable transmission starts at zero-speed and zero-torque. At the middle stage of starting, the resistance to the bucket wheel set 6 increases rapidly, and the resistance finally acts on the first support frame 7, the second support frame 8 and the third support frame 9, and also acts on the intermediate housing 101. The input torque of the first shaft 10 acts on the second planet gear 402 through the first sun gear 301, the first planet gear 302 and the planet gear shaft 13, a part of the torque is used for revolution torque, and a part of the torque is used for overcoming the resistance torque of the second shaft 11. When the resistance F3 to which the third shaft 12 is subjected is a braking force, the resistance F3 acts on the bucket wheel 601 through the bucket wheel sun gear 501, the bucket wheel planet wheel 502 and the bucket wheel planet gear shaft 14. The resistance formed by the bucket wheel 601 prevents the outer housing 1 from revolving counterclockwise. When the resistance F3 to which the third shaft 12 is subjected is a motor charging resistance, the resistance formed by the bucket wheel 601 for preventing the outer housing 1 from revolving counterclockwise increases slower, which delays the starting time. When the resistance F3 to which the third shaft 12 is subjected is added power of the motor, the resistance formed by the bucket wheel 601 for preventing the outer housing 1 from revolving counterclockwise increases faster, which shortens the starting time and improves significantly torque and speed increasing function of the continuously variable transmission.

The resistance of the bucket wheel 601 is related to the rotation speed of the bucket wheel 601 and the revolution speed of the outer housing 1. When the input end is in a low rotation speed condition, the revolution speed is low, and the resistance provided by the bucket wheel 601 is insufficient, resulting in unsatisfactory output torque. If braking resistance control is applied to the outer housing 1 at this time, the resistance is set to F4, and the outer housing 1 is prevented from rotating counterclockwise through the housing control end 16, which reduces the dependence on the resistance provided by the bucket wheel 601 and increases the output torque. When the housing control end 16 is connected to the motor, if the outer housing 1 is in half braking, the continuously variable transmission achieves the continuously variable speed function, and if the outer housing 1 is in full braking, the continuously variable transmission achieves the reducer function. When the resistance F4 applied by the housing control end 16 is the motor charging resistance, F4 becomes the resistance that prevents the outer housing 1 from rotating counterclockwise, which makes up for the resistance of the bucket wheel 601 preventing the outer housing from rotating counterclockwise, and shortens the starting time. At the acceleration stage, F4 can be controlled by the motor to apply force clockwise to the housing control end 16. which improves significantly torque and speed increasing function of the continuously variable transmission.

When the continuously variable transmission is in rated working condition, the speed and torque are relatively stable, the third shaft 12 is adjusted to be synchronized with the first shaft 10, and the housing control end 16 is adjusted to be free. At this time, the bucket wheel 601 is in a force balance state and will not rotate, and the mutual gears do not rotate, so that the continuously variable transmission achieves synchronous transmission of power, which is close to 1:1 transmission.

The third shaft 12 or the housing control end 16 of the continuously variable transmission can also adopt a one-way clutch or an overrun clutch to implement simple control. The hybrid power transmission system formed after adding the motor can complete many control functions, which will not be described redundantly here.

In the Embodiment 1, the bucket wheel planet gear set 5 is located outside the first planet gear set 3 and close to the first end cover 102, and the third shaft 12 connected to the bucket wheel sun gear 501 of the bucket wheel planet gear set 5 is a hollow shaft and penetrates through the first end cover 102. The first shaft 10 connected to the first sun gear 301 of the first planet gear set 3 penetrates through the hollow third shaft 12, and the first shaft 10, the second shaft 11, the third shaft 12 and the housing control end 16 are four control ends, which brings the following benefits.

Since the main shaft of the motor is easy to be made into a hollow shaft penetrating the entire motor axis, when the first shaft 10 is connected to the engine and the second shaft 11 is connected to the output device, the third shaft 12 is connected to the motor with a hollow shaft, the first shaft 10 penetrates through the third shaft 12 and is connected to the motor with a hollow shaft, the engine and the motor are installed coaxially, the housing control end 16 is connected to the motor with a hollow shaft, the second shaft 11 penetrates through the motor provided with a hollow shaft, which is connected to the housing control end 16, and the output device and the motor are installed coaxially. When the first shaft 10 is connected to the output device and the second shaft 11 is connected to the engine, similarly, the housing control end 16 and the third shaft 12 can cooperate with the first shaft 10 and the second shaft 11 to achieve the coaxial installation. When the position of the housing control end 16 is changed from being on the second end cover 103 of the Embodiment 1 to being on the first end cover 102, the housing control end 16 is connected to the motor with a hollow shaft, the third shaft 12 is connected to the motor with a hollow shaft, the first shaft 10 is connected to the engine, the second shaft 11 is used as the output end, or the position of the engine and that of the output end are exchanged, which can achieve the coaxial installation. The continuously variable transmission is easy to cooperate and constitute a compact transmission system suitable for hybrid power.

Figure 1:
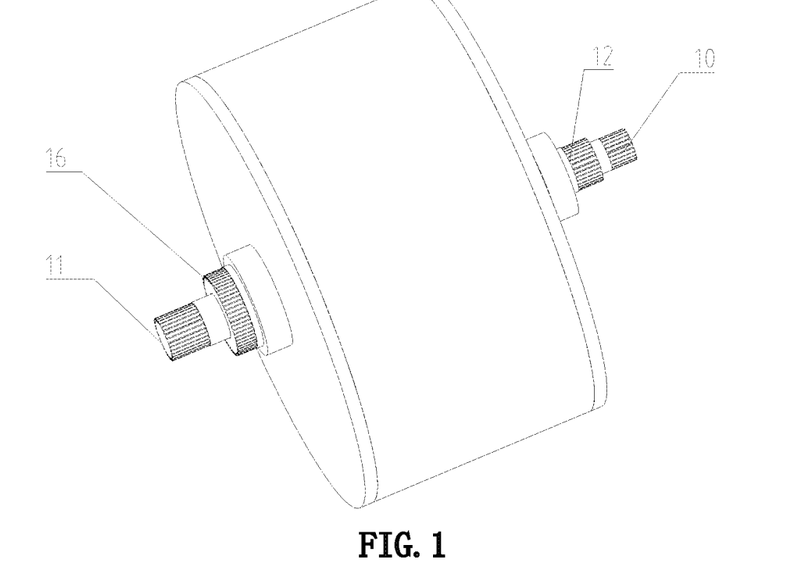
FIG. 1 is an axonometric view of Embodiment 1 of the present invention.
Figure 2:
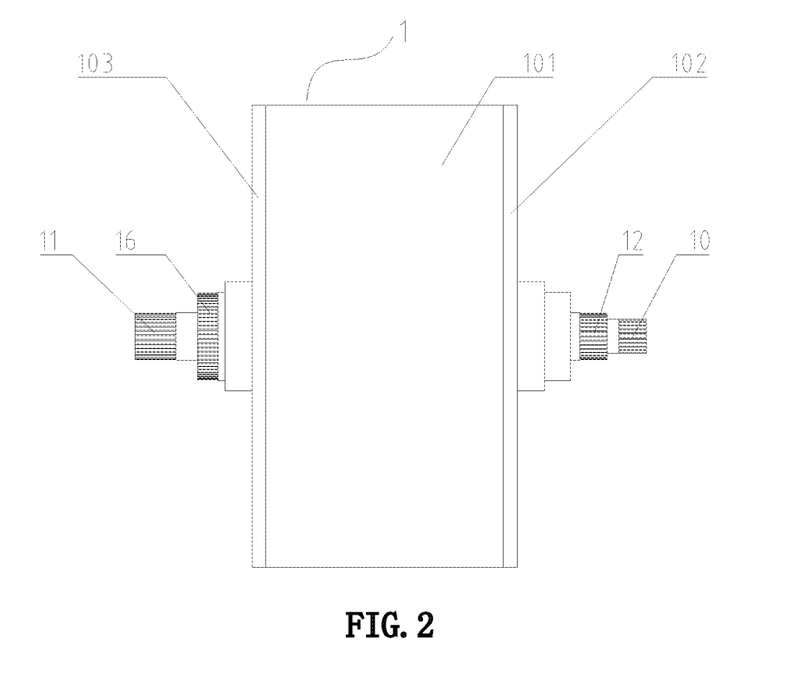
FIG. 2 is a front view of FIG. 1.
Figure 3:
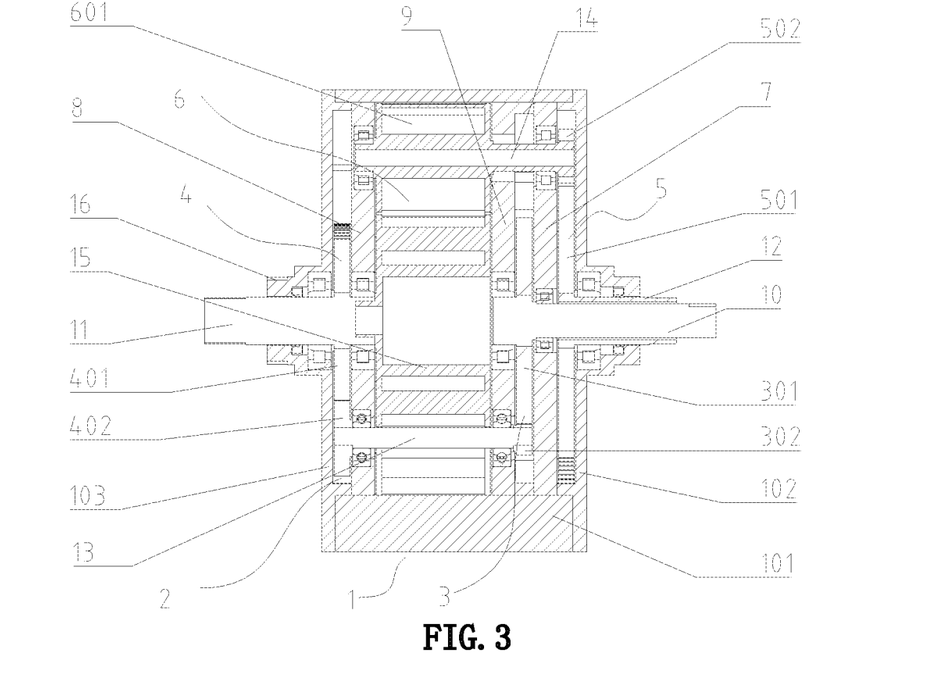
FIG. 3 is a section view of FIG. 1.
Figure 4:
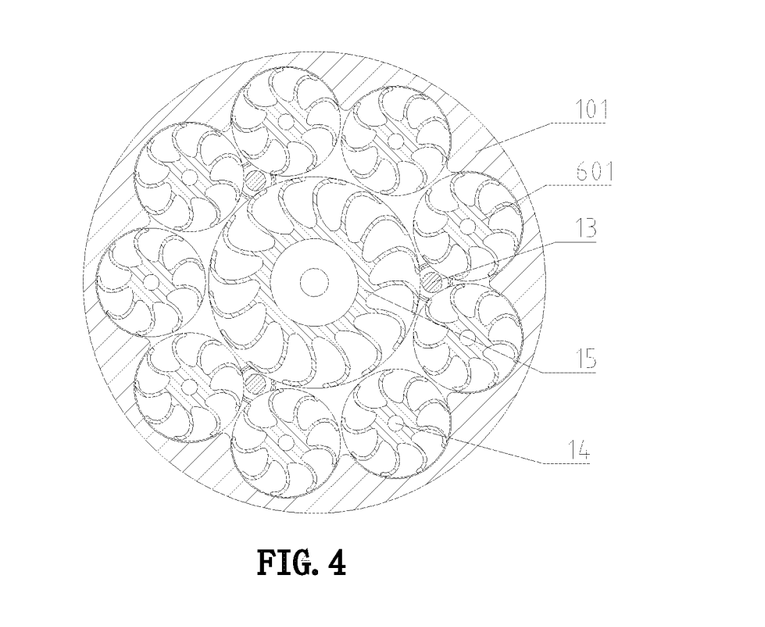
FIG. 4 is a section view of FIG. 3.
Figure 5:
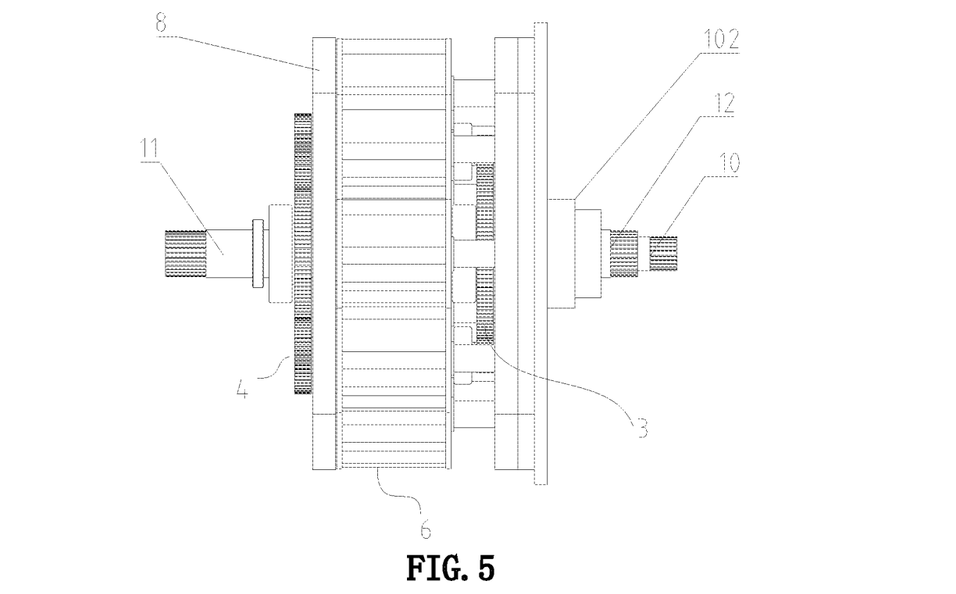
FIG. 5 is a structural schematic view after removing an outer housing and a third support frame.

At the same time, it can be seen from FIG. 4 that, since the position of the bucket wheel planet gear shaft 14 is outside the circumference of the planet gear shaft 13, that is, a rotation radius of the bucket wheel planet gear 502 revolving around the bucket wheel sun gear 501 is larger than that of the second planet gear 402 revolving around the second sun gear 401 and the first planet gear 302 revolving around the first sun gear 301, the kinetic stress radius of oil in the bucket wheel 601 is larger than the gear stress radius of the first planet gear 302 and the second planet gear 402, so that the capacity of transmitting torque by the continuously variable transmission is stronger, and the continuously variable transmission of the same volume will transmit greater torque.

Figure 6:
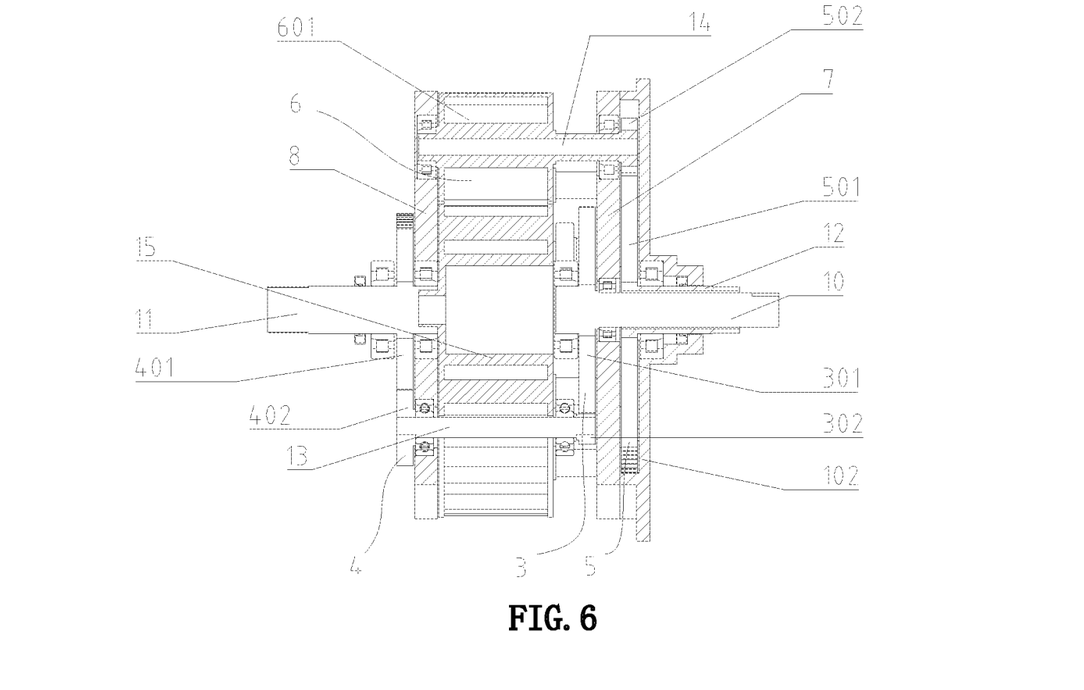
FIG. 6 is a section view of FIG. 5.
Figure 7:
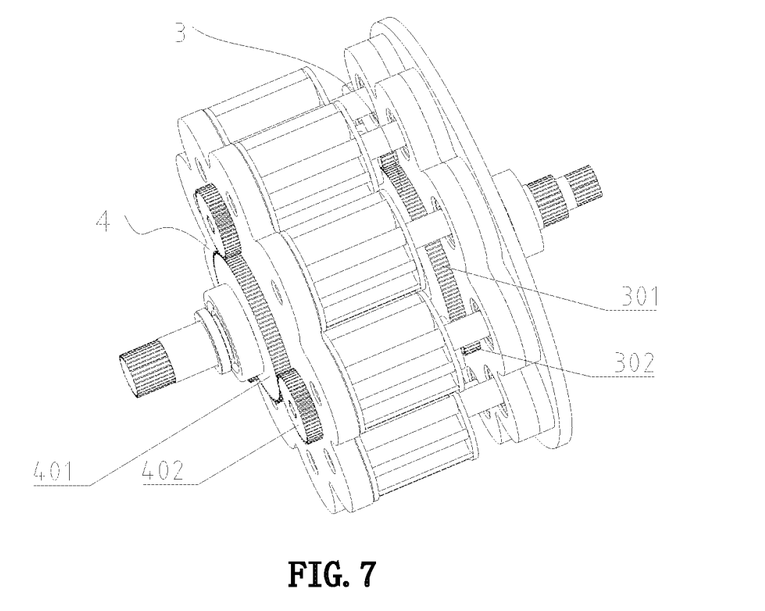
FIG. 7 is an axonometric view after removing the outer housing and the third support frame.
Figure 8:
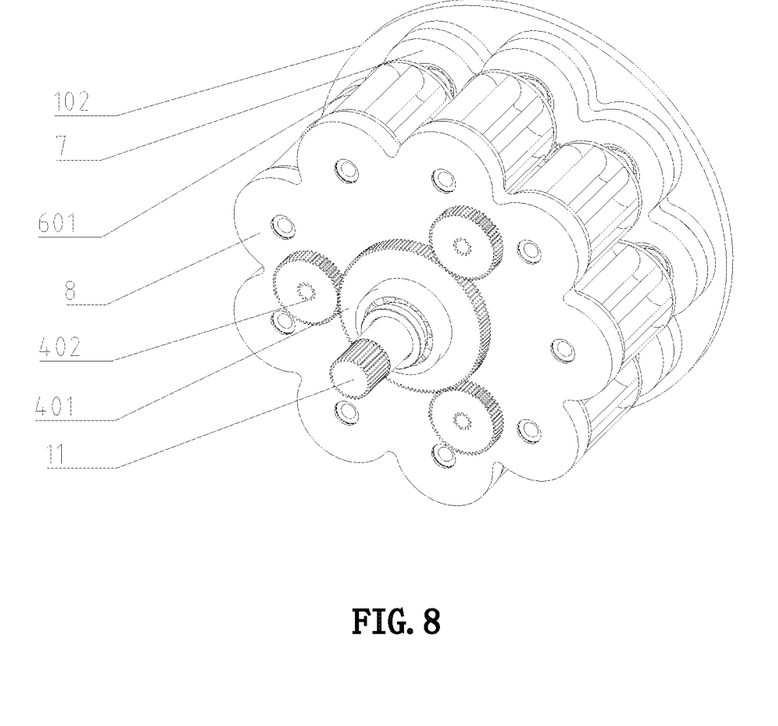
FIG. 8 is an axonometric view in another direction after removing the outer housing and the third support frame.
Figure 9:
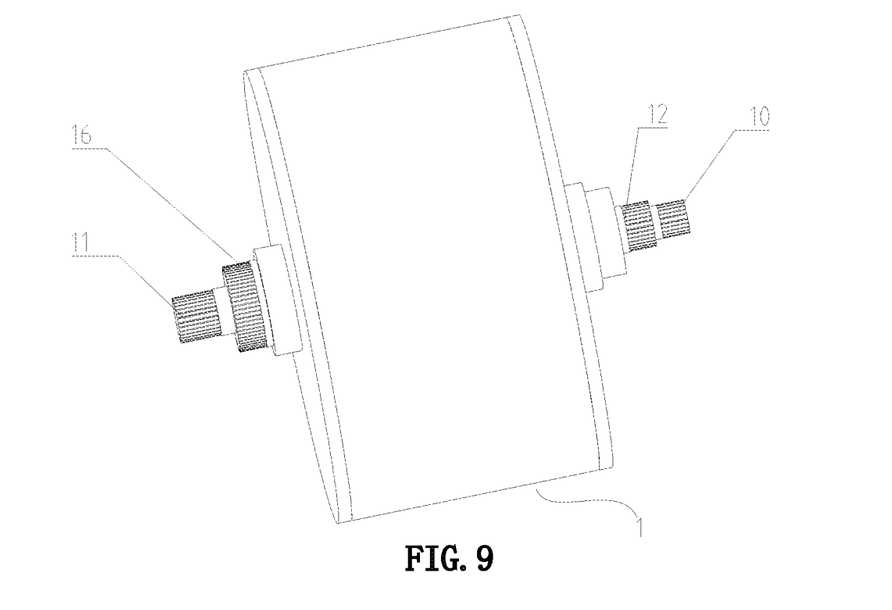
FIG. 9 is an axonometric view of Embodiment 2 of the present invention.
Figure 10:
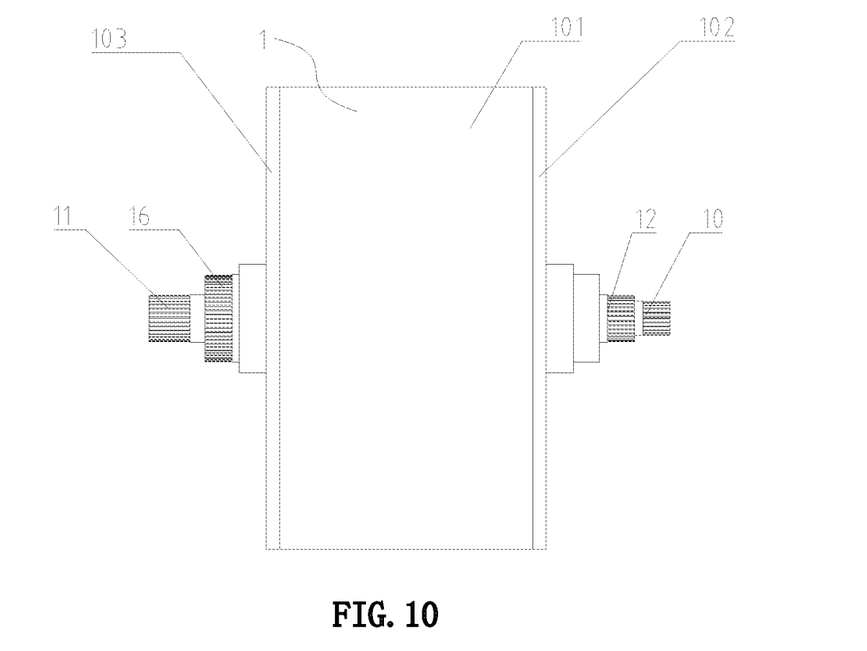
FIG. 10 is a front view of FIG. 9.

Also, it can be seen from FIG. 6 that, since the planet gear shaft 13 and the bucket wheel planet gear shaft 14 are not coaxial, on the second support frame 8, the bearing supporting the planet gear shaft 13 and the bearing supporting the bucket wheel planet gear shaft 14 are arrayed on the same plane, which reduces the thickness of the second support frame 8 and shortens the length of the continuously variable transmission, compared with the installation manner of the bearing being arrayed on the same axis.

It can be seen from FIG. 4 that, a semicircular cavity is provided in a position corresponding to the bucket wheel 601 in an inner wall of the outer housing 1, and the bucket wheel 601 is located in the semicircular cavity in the inner wall of the outer housing 1. The hydrodynamic force and the hydrodynamic viscous force of the bucket wheel 601 will exert more effective performance. The compact optimization of structure is achieved and the better performance is satisfied at the same time.

This series of continuously variable transmission may select 3 or more first planet gears 302 and second planet gears 402. In this embodiment, there are three first planet gears 302 and three second planet gears 402. Different numbers of the first planet gears 302 and the second planet gears 402 can be set according to transmitted power and used size, so as to adapt to different application requirements and select different numbers.

100481 This series of continuously variable transmission may select 3 or more bucket wheel planet gears 502. In this embodiment, there are nine bucket wheel planet gears 502. Different numbers of the bucket wheel planet gears 502 can be set according to transmitted power and used size, so as to adapt to different application requirements. Generally, different numbers can be selected, such as 6, 9, 12, and the like.

It can also be seen in FIG. 4 that, a central bucket wheel 15 is fixedly provided on the second shaft 11, and is located between the second support frame 8 and the third support frame 9. Providing the central bucket wheel 15 can adjust the operation mode of the oil in the inner cavity 2 and adjust the operation performance. The central bucket wheel 15 may also be provided on the first shaft 10.

In the above Embodiment 1, a gear outer engagement manner of the bucket wheel sun gear 501 and the bucket wheel planet gear 502 in the bucket wheel planet gear set 5 can be replaced with a gear ring inner engagement manner of a bucket wheel gear ring and the bucket wheel planet gear; also, a gear outer engagement manner of the first sun gear 301 and the first planet gear 302 in the first planet gear set 3 can be replaced with a gear ring inner engagement manner of a first gear ring and the first planet gear; or, a gear outer engagement manner of the second sun gear 401 and the second planet gear 402 in the second planet gear set 4 can be replaced with a gear ring inner engagement manner of a second gear ring and the second planet gear. The advantage of this design is in that, different transmission ratios can be flexibly set to meet the power transmission requirements of various different occasions.

Embodiment 2

FIGS. 9-14 show Embodiment 2 of a continuously variable transmission of the present invention. The continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity; a third shaft 12 penetrates in the middle of the first end cover 102, the inside of the third shaft 12 is a hollow structure, the third shaft 12 is rotatably connected to the first end cover 102, a bucket wheel gear ring 501A is fixedly provided on the third shaft 12, the bucket wheel gear ring 501A is located inside the first end cover 102, the bucket wheel gear ring 501A is adjacently provided with a first support frame 7, a bucket wheel planet gear 502 is provided inside an outer circumference of the bucket wheel gear ring 501A, the bucket wheel planet gear 502 is engaged with the bucket wheel gear ring 501A, and the bucket wheel planet gear 502 and the bucket wheel gear ring 501A constitute a bucket wheel planet gear set 5; a second shaft 11 penetrates in the middle of the second end cover 103, the second shaft 11 is rotatably connected to the second end cover 103, a second gear ring 401A is fixedly provided on the second shaft 11, the second gear ring 401A is located inside the second end cover 103, the second gear ring 401A is adjacently provided with a second support frame 8, a second planet gear 402 is provided inside an outer circumference of the second gear ring 401A, the second planet gear 402 is engaged with the second gear ring 401A, and the second planet gear 402 and the second gear ring 401A constitute a second planet gear set 4; a first gear ring 301A is provided inside the first support frame 7, a third support frame 9 is adjacently provided inside the first gear ring 301A, a first shaft 10 is fixedly provided in the middle of the first gear ring 301A, the first shaft 10 penetrates through the first support frame 7 and the third shaft 12 whose inside is a hollow structure, the first shaft 10 is rotatably connected to the first support frame 7, a first planet gear 302 is provided inside an outer circumference of the first gear ring 301A, the first planet gear 302 is engaged with the first gear ring 301A, and the first planet gear 302 and the first gear ring 301A constitute a first planet gear set 3; a bucket wheel planet gear shaft 14 is fixedly provided in the middle of the bucket wheel planet gear 502, the bucket wheel planet gear shaft 14 passes through the first support frame 7 and the third support frame 9, the bucket wheel planet gear shaft 14 is rotatably connected to the first support frame 7 and the third support frame 9, a bucket wheel 601 is fixedly provided on the bucket wheel planet gear shaft 14 passing through the third support frame 9, the bucket wheel 601 is located between the second support frame 8 and the third support frame 9, and the bucket wheels 601 fixedly provided on a plurality of the bucket wheel planet gear shafts 14 constitute a bucket wheel set 6; a planet gear shaft 13 is fixedly provided in the middle of the first planet gear 302, the planet gear shaft 13 passes through the third support frame 9 and the second support frame 8, the planet gear shaft 13 is rotatably connected to the third support frame 9 and the second support frame 8 respectively, and the planet gear shaft 13 passing through the third support frame 9 and the second support frame 8 is fixedly connected to the second planet gear 402; a rotation radius of the bucket wheel planet gear 502 revolving around the bucket wheel gear ring 501A is larger than that of the second planet gear 402 revolving around the second gear ring 401A and the first planet gear 302 revolving around the first gear ring 301A.

Figure 11:
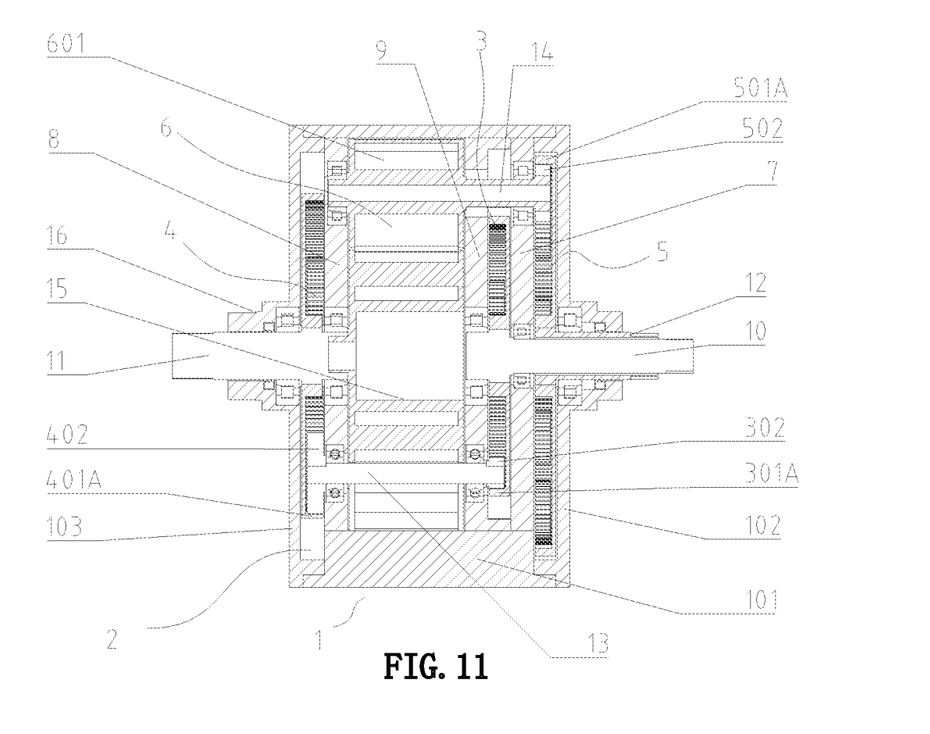
FIG. 11 is a section view of FIG. 9.
Figure 12:
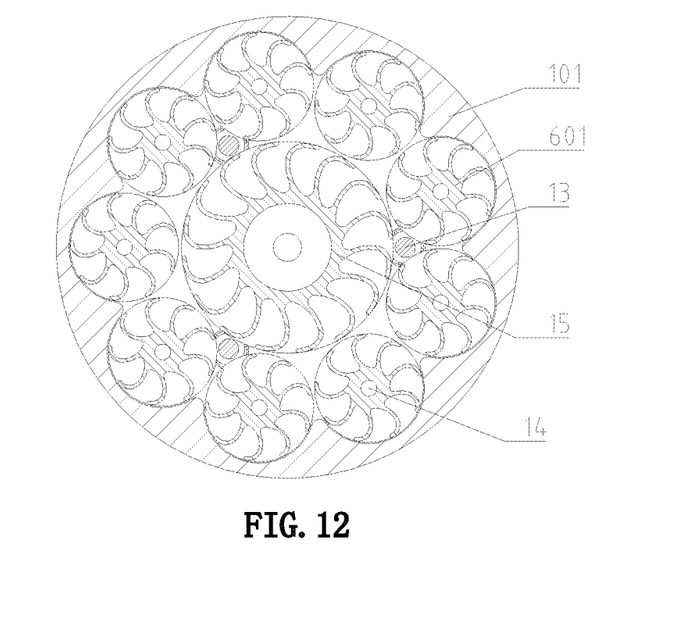
FIG. 12 is a section view of FIG. 11.
Figure 13:
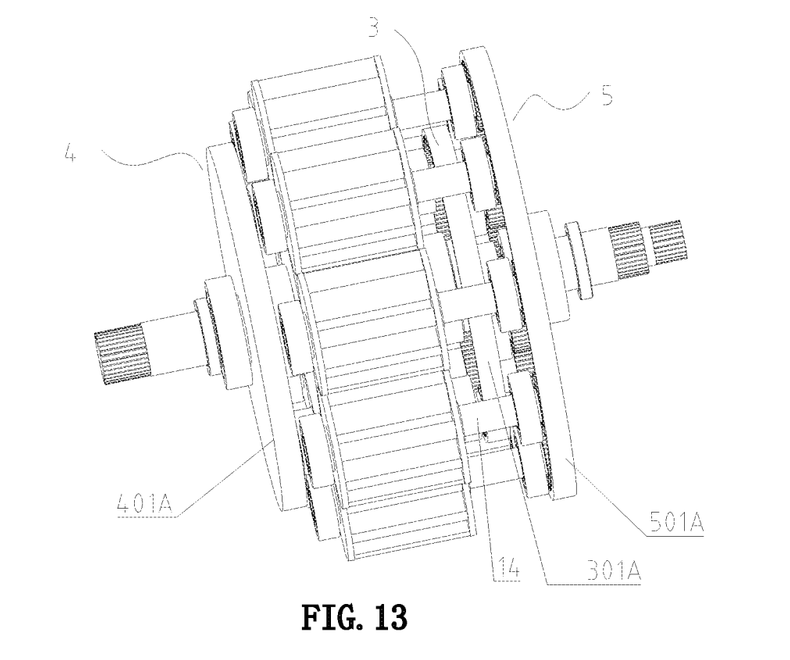
FIG. 13 is a structural axonometric view after removing the outer housing, a first support frame, a second support frame and the third support frame.
Figure 14:
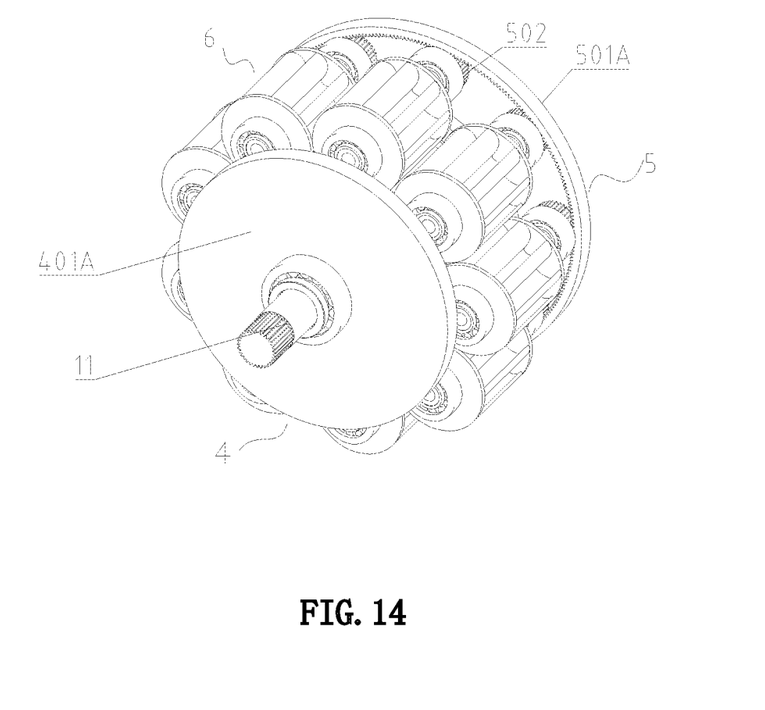
FIG. 14 is an axonometric view in another direction after removing the outer housing, the first support frame, the second support frame and the third support frame.

As can be seen in FIG. 11, the differences from Embodiment 1 are in that, in this embodiment, the first sun gear 301 in Embodiment 1 is replaced with the first gear ring 301A, the second sun gear 401 in Embodiment 1 is replaced with the second gear ring 401A, the bucket wheel sun gear 501 is replaced with the bucket wheel gear ring 501A, engagement outer diameters of the first gear ring 301A, the second gear ring 401A and the bucket wheel gear ring 501A are larger than those of the first sun gear 301, the second sun gear 401 and the bucket wheel sun gear 501, the transmitted torque is large, and the efficiency of engagement transmission between the gear ring and the planet gear is higher than that between the sun gear and the planet gear, which can well improve the power transmission performance of the continuously variable transmission, and is more suitable for field applications that need to transmit greater power and torque.

It has been verified by test that, compared with Embodiment 1, Embodiment 2 increases the torque transmission capacity by about 40%, while reducing the damage of centrifugal force of the first planet gear 302, the second planet gear 402 and the bucket wheel planet gear 502 during operation. At the same time, the lubrication performance is better, and the application of different working conditions of the continuously variable transmission can be satisfied.

The above are only the specific embodiments of the present invention, and the implementation scope of the present invention is not limited thereto, and thus all of the replacement of the equivalent components thereof, or the equivalent changes and modifications made according to the claimed scope of the present invention should still fall within the scope encompassed by the claims of the present invention.

What is claimed is:

1. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a third shaft penetrates in the middle of the first end cover, the inside of the third shaft is a hollow structure, the third shaft is rotatably connected to the first end cover, a bucket wheel sun gear is fixedly provided on the third shaft, the bucket wheel sun gear is located inside the first end cover, the bucket wheel sun gear is adjacently provided with a first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set;

a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set;

a first sun gear is provided inside the first support frame, a third support frame is adjacently provided with the first sun gear, a first shaft is fixedly provided in the middle of the first sun gear, the first shaft penetrates through the first support frame and the third shaft whose inside is a hollow structure, the first shaft is rotatably connected to the first support frame, a first planet gear is provided on an outer circumference of the first sun gear, the first planet gear is engaged with the first sun gear, and the first planet gear and the first sun gear constitute a first planet gear set;

a bucket wheel planet gear shaft is fixedly provided in the middle of the bucket wheel planet gear, the bucket wheel planet gear shaft passes through the first support frame and the third support frame, the bucket wheel planet gear shaft is rotatably connected to the first support frame and the third support frame, a bucket wheel is fixedly provided on the bucket wheel planet gear shaft, passing through the third support frame, the bucket wheel is located between the second support frame and the third support frame, and a plurality of the bucket wheels fixedly provided on a plurality of the bucket wheel planet gear shafts constitute a bucket wheel set;

a planet gear shaft is fixedly provided in the middle of the first planet gear, the planet gear shaft passes through the third support frame and the second support frame, the planet gear shaft is rotatably connected to the third support frame and the second support frame respectively, and the planet gear shaft passing through the third support frame and the second support frame is fixedly connected to the second planet gear;

a rotation radius of the bucket wheel planet gear revolving around the bucket wheel sun gear is larger than that of the second planet gear revolving around the second sun gear and the first planet gear revolving around the first sun gear.

2. The continuously variable transmission according to claim 1, characterized in that, the outer housing is provided with a housing control end.

3. The continuously variable transmission according to claim 1, characterized in that, there are 3 or more bucket wheel planet gears or first planet gears or second planet gears.

4. The continuously variable transmission according to claim 1, characterized in that, a central bucket wheel is fixedly provided on the first shaft or the second shaft.

5. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a third shaft penetrates in the middle of the first end cover, the inside of the third shaft is a hollow structure; the third shaft is rotatably connected to the first end cover, a bucket wheel gear ring is fixedly provided on the third shaft, the bucket wheel gear ring is located inside the first end cover, the bucket wheel gear ring is adjacently provided with a first support frame, a bucket wheel planet gear is provided inside an outer circumference of the bucket wheel gear ring, the bucket wheel planet gear is engaged with the bucket wheel gear ring, and the bucket wheel planet gear and the bucket wheel gear ring constitute a bucket wheel planet gear set;

a second shaft penetrates in the middle of the second end cover, the second shaft is rotatably connected to the second end cover, a second gear ring is fixedly provided on the second shaft, the second gear ring is located inside the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set;

a first gear ring is provided inside the first support frame, a third support frame is adjacently provided with the first gear ring, a first shaft is fixedly provided in the middle of the first gear ring, the first shaft penetrates through the first support frame and the third shaft whose inside is a hollow structure, the first shaft is rotatably connected to the first support frame, a first planet gear is provided inside an outer circumference of the first gear ring, the first planet gear is engaged with the first gear ring, and the first planet gear and the first gear ring constitute a first planet gear set;

a bucket wheel planet gear shaft is fixedly provided in the middle of the bucket wheel planet gear, the bucket wheel planet gear shaft passes through the first support frame and the third support frame, the bucket wheel planet gear shaft is rotatably connected to the first support frame and the third support frame, a bucket wheel is fixedly provided on the bucket wheel planet gear shaft passing through the third support frame, the bucket wheel is located between the second support frame and the third support frame, and the plurality of the bucket wheels fixedly provided on a plurality of the bucket wheel planet gear shafts constitute a bucket wheel set;

a planet gear shaft is fixedly provided in the middle of the first planet gear, the planet gear shaft passes through the third support frame and the second support frame, the planet gear shaft is rotatably connected to the third support frame and the second support frame respectively, and the planet gear shaft passing through the third support frame and the second support frame is fixedly connected to the second planet gear;

a rotation radius of the bucket wheel planet gear revolving around the bucket wheel gear ring is larger than that of the second planet gear revolving around the second gear ring and the first planet gear revolving around the first gear ring.

* * * * *